May 11, 1937. D. M. CRIST 2,079,602
PRODUCTION OF FERRIC HYDROXIDE
Filed Dec. 4, 1934
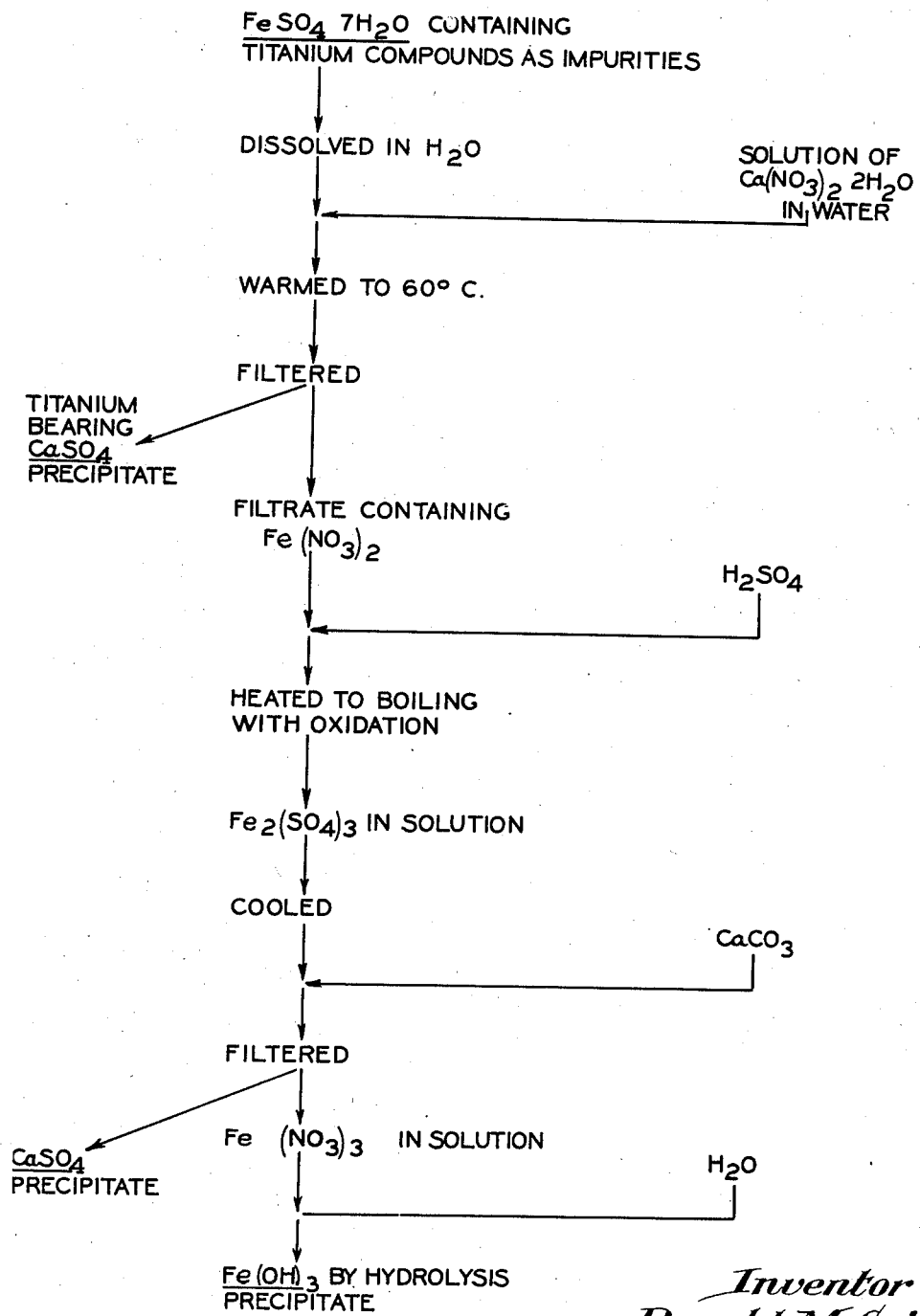

Patented May 11, 1937

2,079,602

UNITED STATES PATENT OFFICE 2,079,602

PRODUCTION OF FERRIC HYDROXIDE

Donald M. Crist, San Francisco, Calif.

Application December 4, 1934, Serial No. 755,908

7 Claims. (Cl. 23—200)

My present invention relates to the production of pure ferric hydroxide, $Fe(OH)_3$ from soluble ferrous iron salts, as for example, ferrous sulphate. Pure yellow ferric hydroxide is in itself a valuable pigment and moreover, forms the starting point of other iron pigments, as for example, red oxide of iron ($Fe_2O_3$). The presence of small amounts of impurities are apt to spoil the color of iron pigments, especially the red oxide and the yellow hydroxide and greatly decrease the value thereof. One of these impurities is ferrous iron itself, and a problem which has beset attempts to make red oxide of iron and other iron pigments from ferrous salts or ferric salts containing ferrous salts as an impurity has been to completely oxidize the ferrous iron. It is, therefore, a principal object of my invention to accomplish this complete oxidation by means which are practicable both from the standpoint of cost and of ease of operation.

A further and important object is to provide a process which also eliminates other impurities than the ferrous iron and makes sources of ferrous sulphate available which are now unutilized. One such source is a by-product from processes now in use for obtaining titanium pigments from titanium bearing ores, such as ilmenite, which invariably contain considerable quantities of iron. In such processes, the iron is separated from the titanium as ferrous sulphate, but the latter is never free from titanium and may contain as much as 3% of this substance as $TiO_2$. The presence of titanium in any form is objectionable in the iron pigments and, for example, makes the production of a brilliant red oxide impossible.

It is known that the oxidation of ferrous iron can be quantitatively produced by the use of nitric acid in sufficient quantity, but this acid is relatively expensive and is difficult to handle. It is a feature of my present invention that I am able to utilize as an oxidant the nitrate radical in a relatively cheap nitrate salt, as for example calcium nitrate, while utilizing this salt as a precipitant for impurities in the ferrous sulphate, particularly titanium. Thus, calcium nitrate, which is the salt preferred, when added to the solution of the crude ferrous sulphate first precipitates calcium sulphate, itself a valuable byproduct, and at the same time carries down out of the solution the major part of the titanium which is present in a suspension to start with. The reaction involved which is one of simple double decomposition is as follows:

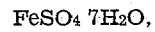
$FeSO_4 + Ca(NO_3)_2 \rightarrow CaSO_4 + Fe(NO_3)_2$

Now it is merely necessary to acidify the solution with sulphuric acid, thereby forming nitric acid in situ to bring about a complete oxidation of the ferrous iron when the solution is maintained near the boiling point. Following this, the impurities present are further got rid of by again precipitating calcium sulphate as by the use of calcium carbonate while maintaining the iron in solution. To precipitate the latter, the solution may simply be diluted whereupon the iron precipitates as pure yellow ferric hydroxide. Manganese, which is a common impurity, remains in the filtrate. The ferric hydroxide formed is then either dried and used as such to constitute a pigment or is calcined to red oxide in the usual manner. Or, the ferric solution may be converted into the other iron pigments as for example by the use of ferrocyanide in a manner well understood. Because of the pure state of the ferric solution, the pigments thus made are characterized by unusual clearness and brilliance of color.

The drawing comprises a so-called flow sheet of an illustrative example of the invention.

The invention will be best understood by reference to the following example illustrative thereof reference being had to the accompanying drawing: One ton ferrous sulphate, $FeSO_4 \cdot 7H_2O$, is dissolved in one thousand gallons of cold water. The titanium which is mostly present as $TiO_2$ is difficultly soluble and will for the most part remain in suspension in the solution. A solution of 1440 pounds commercial calcium nitrate, $Ca(NO_3)_2 \cdot 2H_2O$, in 600 gallons of cold water is now prepared and added to the ferrous sulphate solution and the mixture warmed to approximately 60° C. Upon the addition of the calcium nitrate solution, calcium sulphate is precipitated, thereby carrying down the greater part of the $TiO_2$ present in the solution. This solution is now filtered to recover the calcium sulphate which may be dehydrated to form approximately 1202 pounds plaster of Paris. The filtrate is then treated to oxidize the iron to the ferric state for which it is merely necessary to add preferably 935 pounds 66 Bé. $H_2SO_4$ (diluted somewhat if desired) and to bring the solution to the boiling point. Oxidation is complete when the solution which first becomes dark turns clear. The iron is now completely converted to the ferric state. Preferably during the heating operation the solution is maintained in a vessel provided with a reflux condenser.

The solution is now allowed to cool and 630 pounds finely ground calcium carbonate, (preferably in the form of a suspension in water) or as much as will just avoid precipitation of the iron, is added. The precipitate from the solution is then recovered as calcium sulphate which may subsequently be dehydrated to yield about 1415 pounds plaster of Paris. Under similar circumstances the zinc, tin, lead, chromium and nickel, if present, will also be removed, the manganese, however, remaining in the filtrate. At this point the solution has a pH value which just prevents the iron from precipitating. The filtrate now consists of a ferric nitrate solution of approximately 1700 gallons containing 575 pounds of iron as ferric hydroxide. This hydroxide can be precipitated by any of the well-known precipitants used in the production of ferric hydroxide or it may preferably be precipitated by hydrolysis upon the addition of from 4 to 6 volumes of water, the manganese, if present, being retained in the solution. The ferric hydroxide will then be precipitated in the yellow form and is washed. If red oxide is sought, ignition of the precipitate in the usual manner follows. Where other iron colors as for example Prussian blue are sought which are formed by precipitation upon reaction with other salts, the ferric solution, instead of being diluted and the iron precipitated by hydrolysis, would be used directly as the source of ferric iron.

The procedure above outlined may be varied considerably, as will be apparent to those skilled in the art, and also to suit different conditions. For example, if a substantially pure ferrous sulphate is available to start with, the precipitation of the sulphate ion may be omitted (unless this is desired for economic reasons) and a salt, such for example as sodium nitrate, added. Also, the acidified solution may be neutralized by means other than calcium carbonate especially where it is unnecessary to precipitate the sulphate. It is to be kept in mind, however, that the precipitation of the calcium sulphate aids greatly in removing impurities since not only do metallic salts of zinc, tin, lead, chromium and nickel precipitate when the hydrogen ion concentration is decreased sufficiently, without however, precipitating the ferric iron, but also because the calcium sulphate or other precipitate acts to clear the solution and especially to seize hold of any suspended material, as for example titanium compounds. The impurities in the ferrous sulphate from the process of making titanium white are such, as a rule, as not to interfere with the usefulness of the calcium sulphate formed which may be converted into a valuable by-product, plaster of Paris, by suitable calcination.

Other sulphate-precipitating cations may, of course, be employed where circumstances make such use desirable. Furthermore, other anions acting to reduce the hydrogen ion concentration may be employed should circumstances permit. Thus, while the carbonates are preferred because of their cheapness yet the acetate anion might also be used. Thus, barium acetate is an example of a salt having a sulphate precipitating cation other than calcium ion and an anion other than carbonate ion which reduces the hydrogen ion concentration. While in the process described, the step of oxidizing by the addition of sulphuric acid is deemed of primary importance, still various other advantages will be preserved (such as the elimination of impurities) if other oxidizing means be used.

I claim:

1. The process of producing pure ferric hydroxide from ferrous sulphate which consists in adding a salt composed of a nitrate anion and a sulphate precipitating cation, removing the precipitate formed which also contains impurities in the ferrous sulphate, particularly titanium compounds, adding sulphuric acid to convert the nitrate ion to free nitric acid while maintaining the temperature conditions so as to cause oxidation of the ferrous iron to ferric iron, then reducing the hydrogen ion concentration to a point below which the iron would precipitate out as ferric hydroxide but at which no substantial quantity of the iron does precipitate, removing any precipitated impurities and then precipitating the iron as ferric hydroxide by further decreasing the hydrogen ion concentration.

2. The process of producing pure ferric hydroxide from ferrous sulphate which consists in adding a salt composed of a nitrate anion and a sulphate precipitating cation, removing the precipitate formed which also contains impurities in the ferrous sulphate, particularly titanium compounds, adding sulphuric acid to convert the nitrate ion to free nitric acid while maintaining the temperature conditions so as to cause oxidation of the ferrous iron to ferric iron, then reducing the hydrogen ion concentration by adding a salt consisting of a sulphate precipitating cation and an anion reducing the hydrogen ion concentration of the sulphate ion without precipitating the iron, and then precipitating the latter by dilution with water.

3. The process of producing pure ferric hydroxide from ferrous sulphate which consists in adding a salt composed of a nitrate anion and a sulphate precipitating cation, removing the precipitate formed which also contains impurities in the ferrous sulphate, particularly titanium compounds, adding sulphuric acid to convert the nitrate ion to free nitric acid while maintaining the temperature conditions so as to cause oxidation of the ferrous iron to ferric iron, then reducing the hydrogen ion concentration by adding calcium carbonate to precipitate at least the major portion of the sulphate ion without precipitating the iron and then precipitating the latter as $Fe(OH)_3$ by dilution with water.

4. The process as set forth in claim 1 in which the ferrous sulphate used is a by-product from the production of titanium dioxide from titanium ores containing iron and contains titanium as an impurity.

5. The process of producing pure trivalent iron compounds from ferrous sulphate which consists in adding to an aqueous solution of ferrous sulphate a salt composed of a nitrate anion and a sulphate precipitating cation, removing the insoluble sulphate salt thus precipitated, acidifying the solution, heating the solution and thereby causing oxidation of the ferrous iron to ferric iron by the action of the nitric acid liberated by the acidification, and then recovering a pure trivalent iron compound by precipitation.

6. The process of producing pure trivalent iron compounds from ferrous sulphate which consists in adding to an aqueous solution of ferrous sulphate a salt composed of a nitrate anion and a sulphate precipitating cation, removing the insoluble sulphate salt thus precipitated, then adding to the solution sulphuric acid, heating the solution and thereby causing oxidation of the ferrous iron to ferric iron by the action of the nitric acid liberated by the sulphuric acid, and then recovering a pure trivalent iron compound by precipitation.

7. The process set forth in claim 5 in which calcium nitrate is the salt added to furnish the nitrate anion and the sulphate precipitating cation.

DONALD M. CRIST.